United States Patent
Cai et al.

(10) Patent No.: US 11,370,705 B2
(45) Date of Patent: Jun. 28, 2022

(54) COMPOSITION AND METHOD FOR MAKING GEOPOLYMER TUBES

(71) Applicant: Novoreach Technologies LLC, Midland, MI (US)

(72) Inventors: Jun Jason Cai, Midland, MI (US); Jia Julia Liu, Midland, MI (US)

(73) Assignee: NOVOREACH Technologies LLC, Midland, MI (US)

( * ) Notice: Subject to any disclaimer, the term of this patent is extended or adjusted under 35 U.S.C. 154(b) by 315 days.

(21) Appl. No.: 16/581,622

(22) Filed: Sep. 24, 2019

(65) Prior Publication Data

US 2021/0094877 A1 Apr. 1, 2021

Related U.S. Application Data

(60) Provisional application No. 62/736,753, filed on Sep. 26, 2018.

(51) Int. Cl.
*C04B 12/00* (2006.01)
*B28B 11/24* (2006.01)
(Continued)

(52) U.S. Cl.
CPC .............. *C04B 12/005* (2013.01); *B28B 1/20* (2013.01); *B28B 11/24* (2013.01); *C04B 22/062* (2013.01)

(58) Field of Classification Search
CPC ........... B28B 1/20; B28B 21/20; B28B 21/02; C04B 12/005
See application file for complete search history.

(56) References Cited

U.S. PATENT DOCUMENTS

| 4,844,855 A * | 7/1989 | Omori ..................... C04B 28/02 264/311 |
| 2007/0125272 A1* | 6/2007 | Johnson ................ C04B 28/006 106/638 |

(Continued)

OTHER PUBLICATIONS

Marcello Romagnoli, Rheology of geopolymer by DOE approach, 2012, Construction and Building Materials, 251-258 (Year: 2012).*

(Continued)

*Primary Examiner* — Kelly M Gambetta
*Assistant Examiner* — Virak Nguon
(74) *Attorney, Agent, or Firm* — Technology Law PLLC; Karen L Kimble

(57) ABSTRACT

A method of manufacturing geopolymer tubes comprises forming a geopolymer composition comprised of an aluminosilicate source and an alkali activator, wherein the geopolymer composition has a fluid consistency and a shear thinning index of greater than 1.05, transferring the geopolymer composition into a tubular mold, rotating the mold to shear and distribute the composition onto the inner wall of the mold until the geopolymer composition reaches non-flowable consistency, and curing the geopolymer in the mold to form geopolymer tubes. A method for making geopolymer tubes with the disclosed geopolymer composition comprises shearing the geopolymer composition in a tubular mold at a high rotational speed to significantly reduce apparent viscosity to form the tubular shape, at least in the initial process stage. A ceramic tube made from the geopolymer composition of the present invention is used as a membrane or adsorbent for filtration applications.

20 Claims, 2 Drawing Sheets

(51) Int. Cl.
  *B28B 1/20*  (2006.01)
  *C04B 22/06*  (2006.01)

(56) References Cited

U.S. PATENT DOCUMENTS

2012/0231186 A1* 9/2012 Burns .................... C01B 33/037
                                                      428/34.1
2018/0162775 A1* 6/2018 Akino ....................... B28B 7/42

OTHER PUBLICATIONS

Monique Tohoué Tognonvi, Julien Soro, Sylvie Rossignol, "Durability of Tubular Geopolymer Reinforced with Silica Sand", New Journal of Glass and Ceramics, 2012, 2, 85-90.
Erwin Mairitsch, Harald Harmuth, "Composition and properties of a metakaolin-based geopolymer binder suitable for shaping using a slinger", Construction and Building Materials 156 (2017) 277-283.

* cited by examiner

COMPOSITION AND METHOD FOR MAKING GEOPOLYMER TUBES

CROSS-REFERENCE TO RELATED APPLICATIONS

The present application claims priority to provisional patent application No. 62/736,753, filed on Sep. 26, 2018. The entire disclosure is included herein in its entirety at least by reference.

FIELD OF THE INVENTION

The instant invention relates to a ceramic tube comprised of a geopolymer composition and method to make them. In particular, the ceramic tube and method relate to the use of a geopolymer composition and centrifugal process to make ceramic tubes.

BACKGROUND OF THE INVENTION

Ceramic tubes have excellent thermal, chemical, and mechanical stabilities and are widely used in many applications including filtration and purification, chemical and pharmaceutical processing, electronic and electrical engineering, high temperature operation, medical and healthcare, etc. Inorganic materials such as alumina, silica, zirconia, titania, silicon carbide, and others are commonly used to manufacture ceramic tubes. Depending on the application and need, ceramic tubes are manufactured in a wide variety of diameters, wall thicknesses, and lengths. In separation and processing applications such as filtration, purification, and chemical and pharmaceutical processing, it is often highly desired that ceramic tubes with small diameters such as a few centimeters or millimeters or even smaller are used to increase their surface area to volume ratio to reduce system size, weight, and cost.

Many aspects such as material composition, fabrication process, and microstructure and property requirements have to be taken to consideration to manufacture ceramic tubes with desired physical, chemical, and functional properties, including acceptable dimensional requirements and surface finish, good mechanical properties and chemical stability, as well as desired pore size and porosity. Key factors in ceramic tube manufacturing include properties of the raw materials, preparation method of the powder or paste, shape forming method, and sintering or heat treatment method. The selection of raw materials and preparation method needs to suit the shape forming method.

Geopolymers are a class of aluminum silicate inorganic polymers which have an amorphous 3-dimensional polysialate network consisting of $SiO_4$ and $AlO_4$ tetrahedra. The general formula of geopolymers is $M_2O\text{-}mA_2O_3\text{-}nSiO_2$, where m=1, $2 \leq n \leq 300$, and M being alkali metals. The formation of a geopolymer involves an aluminosilicate source material and an alkali activator solution. In a typical synthesis, calcined clay or fly ash is mixed with alkali silicate and hydroxide solutions to form a geopolymer. The geopolymerization process consists of three separate but inter-related stages: 1) dissolution of aluminum and silicon ions from the aluminosilicate source to form mobile monomers through the reaction with hydroxide ions; 2) re-orientation and re-arrangement of the monomers and formation of larger oligomers; 3) polycondensation of oligomers to form rigid 3-dimensional network of oxygen bonded $SiO_4$ and $AlO_4$ tetrahedra.

Geopolymer materials can set at ambient temperature and achieve many excellent material properties such as high mechanical strength as well as thermal and chemical stabilities. One typical characteristic of geopolymers is their ability to set and develop material strength at ambient or slightly elevated temperature after mixing. They have been used in a number of applications such as construction cement and refractory materials. However, as geopolymerization process starts as soon as an alkali hydroxide and silicate activator is mixed with an aluminosilicate source material, geopolymers typically set in a few hours, during which the mixture develops rigid polymeric network, loses plasticity and becomes hard, and achieves high material strength.

The most common ceramic tube fabrication process used by the industry is extrusion. Eucker et al. teach in U.S. Pat. No. 7,524,264 a method of manufacturing ceramic tubes using ceramic powders by extrusion through a die. Ceramic powders are mixed with plasticizers and solvents to form an extrudable mixture. The mixture is extruded continuously though a die to produce tubes with desired dimensions. The extruded tube is finally dried and calcined at high temperatures to remove organic binders in the extrusion paste and sinter ceramic materials to produce ceramic tubes with desired microstructure and mechanical strength.

Although extrusion is the prevalent process to produce ceramic tubes, it is not a preferred method to produce geopolymer tubes. The fast setting characteristic of geopolymer materials at ambient temperature will cause a geopolymer extrusion paste to quickly lose its plasticity and render the paste useless for extrusion in a short period of time, usually within hours. Additionally, as geopolymers are normally cured at ambient or slightly elevated temperatures, the organic binders used to prepare extrusion pastes to provide desired extrusion properties cannot be removed in the curing process and are detrimental to the mechanical, thermal, and chemical properties of geopolymer tubes.

In US Patent Application 20070125272 A1, G. Johnson describes that conventional geopolymer compositions cannot be used for centrifugal manufacturing to produce pipes, poles and the like because their working time is too short. The inventor teaches a method of manufacturing geopolymer concrete pipes by centrifugal processes using a geopolymer concrete composition characterized in that its water content is insufficient to provide a slumped concrete and $SiO_2$ to $M_2O$ ratio of its metal silicate and metal hydroxide component is at least 0.8 to delay setting and extend working time in order to form geopolymer concrete pipes. The geopolymer concrete composition is said to have a no-slump consistency that the concrete does not exhibit any measurable slump when placed on a hard flat surface, to manufacture geopolymer concrete pipes with diameters ranging from 375 to 1500 mm using centrifugal processes. However, lack of flowability makes it difficult or impossible to transfer the no-slump geopolymer composition into molds with small inner diameters to fabricate tubes with outer diameters in a millimeter to a few centimeters range.

Tognonvi et al., in "Durability of Tubular Geopolymer Reinforced with Silica Sand", New Journal of Glass and Ceramics, 2012, 2, 85-90, describe a method of making a geopolymer mixture with fluid consistency and pouring it into a tubular mold with a core to produce geopolymer tubes using a slip casting method. The geopolymer is cured in the mold and then extracted. The slip casting method requires a tubular mold with a core, which can cause shrinkage defects in the geopolymer tube during curing. In addition, the method requires molds with high dimensional accuracy and surface smoothness, demands a dedicated set of molds for each set of tubes with different diameters, wall thicknesses, and lengths, and has a delicate and tedious demolding process, resulting in long production cycle, low production efficiency and high production cost.

Therefore, it would be desirable to provide a geopolymer composition and tube manufacturing method to avoid one or more problems described above to fabricate geopolymer tubes with any of the tube dimensions including diameter, wall thickness, and length, easily adjustable in a wide size range from a millimeter to a few centimeters or larger, and with high quality surface finish, short production cycle, and low production cost.

BRIEF SUMMARY OF THE INVENTION

The instant invention discloses a ceramic tube composition and manufacturing process that uses a geopolymer composition with fluid consistency and a shear thinning index of greater than 1.05, and utilizes centrifugal processes to fabricate tubular ceramic parts with easily adjustable tube dimensions including diameter, wall thickness, and length ranging from a millimeter to a few centimeters or larger, with high quality surface finish, and without high temperature ceramic firing.

One aspect of the invention is a geopolymer composition with fluid consistency and a shear thinning index of greater than 1.05, which allows easy transferring of geopolymer compositions with a broad range of viscosities into tubular molds of a variety of inner diameters ranging from a millimeter to a few centimeters or larger. Geopolymer compositions with high viscosities can be advantageously used to fabricate tubes using tubular molds with small diameters and also reduce the possibility of geopolymer composition variation due to centrifugal processing.

Another aspect of the invention is a method of forming a geopolymer tube with any of the tube dimensions including diameter, wall thickness, and length, easily adjustable in a wide size range from a millimeter to a few centimeters or larger using centrifugal processes. The centrifugal processes in the instant invention shear the geopolymer composition in a tubular mold to take advantage of the shear thinning property of the disclosed geopolymer composition to reduce geopolymer apparent viscosity, allowing an instant and even distribution of the geopolymer composition onto the inner surface of the mold with fewer defects. The centrifugal processes can also advantageously comprises two process phases: a high speed phase which helps reduce defects and achieve an even distribution with a reduced geopolymer viscosity at a high shear rate, and a low speed process which is sufficient to maintain the tubular form with a high geopolymer viscosity before the geopolymer composition loses its flowability and plasticity and becomes set, preventing unwanted composition variations as a result of high speed rotations and reducing energy consumption in the manufacturing process.

The geopolymer tubes disclosed in the instant invention may be used in any applications requiring ceramic tubes, including filtration and purification, ceramic supports for membranes, high temperature operations, structure and engineering materials, and other applications demanding tubes with high thermal, chemical, and mechanical stabilities.

DETAILED DESCRIPTION OF THE INVENTION

Figure 1:
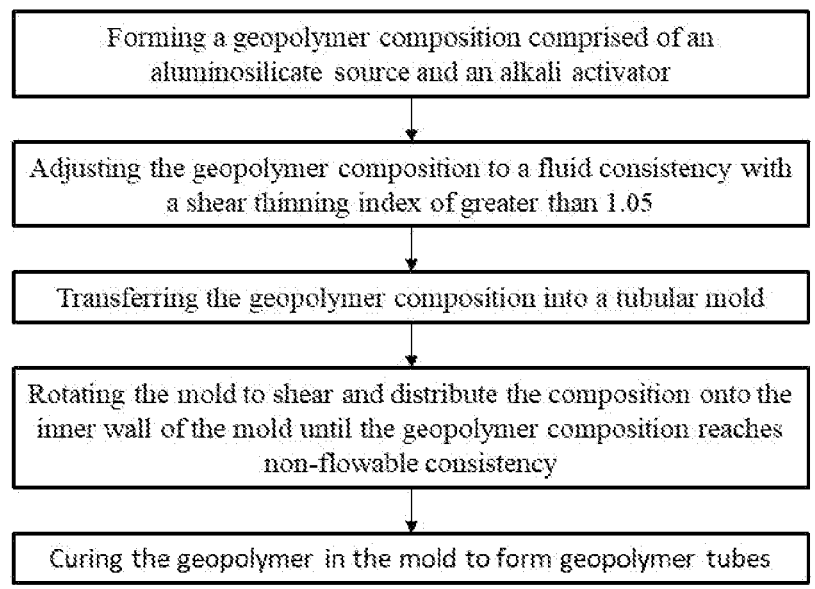
FIG. 1 depicts method steps for forming geopolymer tubes according to an embodiment of the present invention.

The instant invention disclose a method of manufacturing tubular geopolymer parts with any of the tube dimensions adjustable in a millimeter to a few centimeters or larger comprising forming a geopolymer composition comprised of an aluminosilicate source and an alkali activator, which has fluid consistency with a shear thinning index of at least 1 and preferably greater than 1.05, and polymerizes to reach non-flowable consistency in 8 hours, preferably in 4 hours, and more preferably in 2 hours, transferring the geopolymer composition into a tubular mold after mixing, rotating the mold to shear and distribute the geopolymer onto the inner wall of the mold until non-flowable consistency is reached, and curing the geopolymer in the mold at a temperature of lower than 150° C. to form tubular geopolymer parts.

Geopolymers are generally prepared by mixing an aluminosilicate source material such as calcined clay or fly ash with an alkali activator solution comprised alkali silicate. Freshly prepared geopolymer mixtures can be viewed as a suspension of aluminosilicate particles in a continuous alkali silicate activator fluid. In geopolymer mixtures, their rheological behaviors are controlled by colloidal interactions attributed to electrostatic and Van der Waals forces, viscous interactions influenced by hydrodynamic forces, and inertial interaction generated by contact forces between particles in the geopolymer mixtures. Depending on geopolymer mixture composition, geopolymer mixtures can behave as a Newtonian fluid which has a constant apparent viscosity, a shearing thinning fluid whose apparent viscosity decreases with increasing shear rate, or a shear thickening fluid whose apparent viscosity increases with increasing shear rate.

In the instant invention, it is discovered that geopolymer mixtures with fluid consistency and a shear thinning index of greater than 1.05 and the ability to polymerize quickly to reach non-flowable consistency after mixing aluminosilicate particles and alkali silicate activator solutions at ambient temperature or slightly elevated temperatures provides an excellent solution to manufacturing tubular geopolymer parts with any of the tube dimensions, including diameter, wall thickness, and length, easily adjustable in a millimeters to a few centimeters or larger using centrifugal processes.

Centrifugal casting is a manufacturing process that delivers castings of very high material uniformity and is generally preferred for producing thin-walled cylinders. In centrifugal casting, a casting material is transferred into a cylindrical mold and the mold is rotated about its axis at high speeds. The casting material is sheared and pushed outward under a centrifugal force and spreads evenly over the inner mold surface where it solidifies. Tubular parts produced by centrifugal casting are isotropic and have equal properties in all directions, which cannot be achieved by other processes such as extrusion, die casting, rolling, etc.

It is discovered in the instant invention that a geopolymer mixture with fluid consistency and a shear thinning index of greater than 1.05 exhibits a reduced apparent viscosity when the mold is rotated to shear the mixture, allowing an instant and even distribution of the geopolymer mixture onto the inner surface of the mold. The reduced viscosity and centrifugal forces exerted by the rotating process to the mixture cause air pockets in the mixture, generated in the mixing process, to migrate to the inner diameter and get eliminated.

The removal of air pockets in the geopolymer mixture reduces air pockets induced defects in the geopolymer tubes, resulting in improved tube microstructure, mechanical properties, and surface finish. The shear thinning property of geopolymer mixtures also allows the centrifugal manufacturing process to transition from a high speed process which helps reduce defects and achieve an even distribution with a reduced geopolymer viscosity, to a low speed process that is sufficient to maintain the tubular form with a high geopolymer viscosity, preventing unwanted composition variations created by high speed rotations, and reducing energy consumption in the manufacturing process.

It is also discovered in the instant invention that it is advantageous to use a shear thinning geopolymer composition that can polymerize rapidly after mixing aluminosilicate particles and alkali silicate activator solutions to reach non-flowable consistency in 8 hours, preferably in 4 hours, and more preferably in 2 hours. In the instant invention, non-flowable consistency means the physical condition that a geopolymer mixture has lost its ability to flow and does not self-level under its own weight. The ability of a geopolymer composition to reach non-flowable consistency quickly reduces the possibility of unwanted composition variation due to long centrifugal processes, allows molded geopolymer parts to be taken of centrifugal processing in a short period of time for continuous operations, and provides the flexibility to cure the molded part under a different curing condition such as an elevated temperature or a controlled humidity level.

When a geopolymer composition exhibiting no-slump or non-flowable consistency right after mixing of aluminosilicate particles and alkali silicate activator solutions is used to manufacture geopolymer tubes using the centrifugal process in the instant invention, geopolymer tubes, especially tubes with small outer diameters in a few millimeters or centimeters range, generally cannot be formed with uniform wall thickness, have many structural defects or air pockets induced voids, or have missing sections in the tube wall. Additionally, it is discovered that no geopolymer tubes can be formed in a millimeter to tens of millimeters size range using a geopolymer composition with no-slump or non-flowable consistency. The viscosity of geopolymer compositions with no-slump or non-flowable consistency cannot be measured using a rotational viscometer which is commonly used to measure the viscosity of mixtures with fluid consistency.

When a shear thickening or near Newtonian geopolymer composition with a shear thinning index of smaller than or about 1 is used to manufacture geopolymer tubes using centrifugal processes, geopolymer tubes generally cannot be formed with the entire geopolymer composition transferred into the mold, or take longer than a practical manufacturing time such as 8 hours or even 24 hours to form with the entire composition. Even if it is formed with the entire composition, the molded part often has a certain degree of composition variation from the outside to the inside and is prone to cracking in geopolymer curing process.

Using the geopolymer composition disclosed in this invention, the dimensions of geopolymer tubes, including diameter, wall thickness, and length, can be easily adjusted in a wide size range from a millimeter to a few centimeters or larger by simply switching to tubular molds with different diameters and lengths. The wall thickness of the geopolymer tubes can be effectively changed by varying the amount of geopolymer mixtures transferred into the molds. The rotation speed of the mold can be conveniently adjusted to produce a shear rate that will effectively reduce geopolymer mixture viscosity to achieve an even distribution and reduce defects, but also will not create excessive centrifugal forces that causes geopolymer composition variations from the outside to the inside.

After an even distribution of a geopolymer mixture is achieved on the inner wall of a tubular mold, the molded geopolymer part can be removed from the centrifugal processing equipment as soon as the geopolymer mixture reaches non-flowable consistency. This offers significant flexibility in the manufacturing process to allow the molded geopolymer parts to be cured under a different condition from that in the centrifugal process. To accelerate the curing and strength development of geopolymer parts, the molded part can be cured at an elevated temperature which is generally lower than 150° C. In addition, the curing of geopolymer tubes can be conducted in the presence of moisture, water, or steam to facilitate geopolymerization and improve microstructure and mechanical properties.

There are many additional advantages to produce ceramic tubes by centrifugal processes using the geopolymer composition disclosed in the instant invention. The molds can be made of any alkali resistant material including plastics, stainless steel, ceramics, and others and are economically available in a wide range of diameters and lengths in millimeters to meters size range. Geopolymer tubes manufactured using the disclosed method will have high dimensional accuracy and surface finish since the outer surface of the geopolymer tubes will match exactly the smooth inner surface of the tubular molds. Due to the absence of a core in the mold, shrinkage defects are minimized as geopolymer can move freely during casting and curing. Additionally, due to the low temperature curing of geopolymer, conventional high temperature ceramic firing process is eliminated, drastically reducing energy use and production time.

The following are details useful in the instant invention:

Geopolymer materials can be synthesized by mixing an aluminosilicate source material, an alkali activator material, and a carrier fluid. The carrier fluid can part of the alkali activator material or aluminosilicate source material. The general formula of geopolymers is $M_2O\text{-}mA_2O_3\text{-}nSiO_2$, where m=1, $2 \leq n \leq 300$, and M being alkali metals. The geopolymer substrates can be fabricated using any suitable composition defined by the general formula of geopolymer.

The geopolymer composition according to the invention generally includes an aluminosilicate source. Any aluminosilicate materials known in the art, or combinations thereof, may be used. Exemplary aluminosilicate materials include, but are not limited to metakaolin, calcined kaolin clays, fly ash, blast furnace slags, aluminum-containing silica fume, and others. A significant part of these aluminosilicate materials is amorphous aluminosilicate phase which reacts easily with strong alkali solutions. It is preferred that the aluminosilicate source is metakaolin, calcined clays, fly ash, slags, or a combination of two or more of these materials.

The geopolymer composition according to the invention generally includes an alkali activator. The alkali activator generally comprises an alkali metal or alkaline earth metal silicate component and an alkali metal or alkaline earth metal hydroxide component. References herein to "alkali" compounds are intended to refer to alkali metals (e.g., Li, Na, and K) and alkaline earth metal (e.g., Mg, Ca) compounds. The alkali silicate component comprises at least one of sodium silicate, potassium silicate, lithium silicate, calcium silicate or magnesium silicate. The alkali silicate component preferably comprises sodium silicate. The alkali hydroxide component comprises at least one of sodium hydroxide, potassium hydroxide, lithium hydroxide and the like, preferably sodium hydroxide.

The geopolymer composition according to the invention generally includes a carrier fluid. The carrier fluid can be water, organic solvents, other liquids, or a combination of two or more fluids. It is preferred that the carrier fluid is water. If the aluminosilicate source or metal hydroxide activator is already in a liquid state, it is considered that the geopolymer composition already has a carrier fluid within.

The geopolymer composition according to the invention exhibits a fluid consistency after mixing aluminosilicate source materials and alkali activator solutions. Consistency is defined as the ability of a freshly prepared mixture such as slurries or pastes to flow. The geopolymer composition disclosed in the invention will form a near level surface under its own weight or when lightly rodded. Representative examples of mixtures with fluid consistency referred in the instant invention include mortar, grout, flowing concrete, medium to high slump concrete, etc. The viscosity of these mixtures with fluid consistency can typically be measured using a rotational viscometer, as indicated in ASTM D2196 (Standard Test Methods for Rheological Properties of Non-Newtonian Materials by Rotational Viscometer) or ASTM E3070 (Standard Test Method for Shear Thinning Index on Non-Newtonian Liquids Using a Concentric Cylinder Rotational Viscometer).

The shear thinning index of the geopolymer composition disclosed in the instant invention is measured using a rotational viscometer according to ASTM E3070. According to the ASTM method, the speed of a spindle immersed in a test specimen is gradually increased until the torque reading is at a minimum but greater than 10% full scale. The apparent viscosity and speed are recorded. Shear thinning index at any two rotational speeds is calculated by dividing the apparent viscosity at the lower rotational speed by the apparent viscosity at the higher rotational speed. In the instant invention, shear thinning index is calculated for each rotational speed recorded except the highest speed by dividing the apparent viscosity at a lower speed by the apparent viscosity at the highest speed recorded for each geopolymer mixture measured. A shear thinning index of 1 indicates Newtonian behavior, a shear thinning index of greater than 1 indicates shear thinning behavior, and a shear thinning index of smaller than 1 indicates a shear thickening behavior. In the instant invention, the shear thinning index is at least 1 and preferably greater than 1.05 to effectively utilize the shear thinning property of the disclosed composition for centrifugal processing.

The viscosity of the geopolymer composition disclosed in the instant invention can be any viscosity of a fluid mixture measurable using a rotational viscometer according to ASTM E3070 with a torque reading of at least 10% full scale, is preferably at least 500 centipoise (cP), is more preferably 3000 to 1000000 cP, and is even more preferably 5000-100000 cP in the low shear range for the centrifugal manufacturing process in the invention to take advantage of the shear thinning property of the disclosed geopolymer composition.

Geopolymers start polymerization as soon as aluminosilicate source materials are mixed with alkali activator solutions. In the geopolymerization process, 3-dimensional network is gradually established until the geopolymer mixture eventually loses its flowability and plasticity and becomes set. Depending on geopolymer composition, it can take a few minutes, a few hours, or even longer for a geopolymer mixture to set at ambient temperature. Additionally, the polymerization process can be accelerated by increasing the alkali activator or aluminosilicate material temperature. In the instant invention, geopolymer composition that allows rapid polymerization after mixing aluminosilicate particles and alkali silicate activator solutions to reach non-flowable consistency in 8 hours, preferably in 4 hours, and more preferably in 2 hours, is advantageously used to enable molded geopolymer parts to be taken off centrifugal processing and to provide the flexibility of curing molded parts under a different curing condition.

The cylindrical molds used in the centrifugal manufacturing process can made of any alkali resistant material including plastics, stainless steel, ceramics, and others. Common commercially available and economic plastic pipes, including polyvinyl chloride (PVC), chlorinated polyvinyl chloride (CPVC), cross-linked polyethylene (PEX), and other pipes, can used as the molds. Stainless steel and ceramic tubes such as alumina, zirconia, and others can also be used. The diameter and length of the tubular molds can range from a millimeter to meters for the manufacturing of geopolymer tubes with a wide range of dimensions. Caps, plugs, or inserts can be used at the ends of the tubular molds to help control the amount and distribution of the geopolymer mixtures in the molds and hence wall thickness of the geopolymer tubes.

The centrifugal processes in the instant invention shape a geopolymer mixture to a tube include horizontal centrifugal process, roller suspension process, and vertical centrifugal process. To effectively shear the geopolymer mixture, the mold is generally rotate at a tangential velocity of at least 0.05 meter per second (m/s) and preferably at least 0.1 m/s at the interface of the mold and geopolymer mixture, depending on the viscosity and shear thinning property of the geopolymer mixture.

The curing of the geopolymer mixture can be conducted at ambient temperature or by raising the temperature of the geopolymer mixture by providing a heat source. The heating can be achieved by convection, radiation, or conduction methods. The curing can be carried out at a temperature between 20 and 150° C., preferably between 40 and 100° C., more preferably between 50 and 80° C. The curing of the geopolymer composition may be conducted generally between 1 and 72 h, preferably between 4 to 48 hours, and more preferably between 8 to 24 hours.

The curing of the geopolymer composition according to this invention may be carried out in presence of air, moisture, steam, carbon dioxide, flue gas, inert gases, water, organic solvents, or other gases or liquids. Most preferably the curing is carried out in the presence of moisture, water, or steam.

The following are optional:

The geopolymer composition according to the invention may optionally include one or more rheology modifiers to modify the rheology behavior of the geopolymer. Any rheology modifiers known in the art, or combinations thereof, may be used. Exemplary rheology modifier include, but are not limited to guar gum, starch, cellulose gums, acrylic polymers, polyethylene glycol, clays, and other organic or inorganic rheology modifiers.

The geopolymer composition according to the invention may optionally include one or more filler materials to provide ductility, resiliency, roughness, or other properties to the geopolymer. Any fillers known in the art, or combinations thereof, may be used. Exemplary fillers include, but are not limited to zeolites, ceramic powder, glass powder, fibers, polymer materials, ground shell powder, wood, carbon black, graphite, mica, even nanosized materials.

The geopolymer composition according to the invention may optionally include one or more porosity modifiers to modify the porosity in the geopolymer. Any porosity modifiers known in the art, such as those generate gas when exposed to high pH or expand in volume upon heating, or combinations thereof, may be used. Exemplary fillers include, but are not limited to metal powder, carbonates, organic hydrocarbons, vermiculites, and others.

Comparative Example A

A geopolymer composition is prepared by mixing PowerPozz metakaolin with a pre-mixed sodium silicate and sodium hydroxide activator solution having a $SiO_2$ to $Na_2O$ weight ratio of 0.8. The geopolymer mixture comprises 55 wt % of metakaolin (PowerPozz metakaolin, Advanced Cement Technologies, Blaine, Wash.), 26 wt % of sodium silicate solution (Grade 40, Occidental Chemical Corporation, Dallas, Tex.), and 19 wt % of sodium hydroxide solution (50% caustic soda diaphragm, Occidental Chemical Corporation, Dallas, Tex.). The geopolymer mixture is mixed using an overhead mixer and manually as needed until a uniform mixture is obtained. The geopolymer mixture is a dry mix with no-slump consistency whose viscosity cannot be measured according to ASTM E3070 using a Brookfield RVTDV-II rotational viscometer with a RV spindle set at room temperature. The mixture is transferred into a PEX pipe mold with a 17 mm inner diameter to fill 50% by volume of the mold. After placing end caps on the mold, the mold is horizontally secured on a variable speed lathe and rotated at ambient temperature at a rotational speed of up to 4000 revolutions per minute (rpm), reaching a tangential velocity of 3.6 m/s at the interface of the mold and geopolymer mixture. No geopolymer tube can be produced even with a prolonged centrifugal time of 8 hours or more in this example.

Comparative Example B

A geopolymer mixture is used to produce geopolymer tubes in the same way as that in Comparative Example A except that a different geopolymer composition is used. The geopolymer composition is prepared by mixing PowerPozz metakaolin with a pre-mixed sodium silicate and sodium hydroxide activator solution having a $SiO_2$ to $Na_2O$ weight ratio of 1.2. The geopolymer mixture comprises 55 wt % of metakaolin (PowerPozz metakaolin, Advanced Cement Technologies, Blaine, Wash.), 32 wt % of sodium silicate solution (Grade 40, Occidental Chemical Corporation, Dallas, Tex.), and 13 wt % of sodium hydroxide solution (50% caustic soda diaphragm, Occidental Chemical Corporation, Dallas, Tex.). The geopolymer mixture is a dry mix with no-slump consistency whose viscosity cannot be measured using a Brookfield RVTDV-II viscometer at room temperature. No geopolymer tube can be produced in this example.

Comparative Example C

A geopolymer mixture is used to produce geopolymer tubes in the same way as that in Comparative Example A except that a different geopolymer composition is used. The geopolymer composition is prepared by mixing OPTIPOZZ metakaolin with a pre-mixed sodium silicate and sodium hydroxide activator solution having a $SiO_2$ to $Na_2O$ weight ratio of 1.3. The geopolymer mixture comprises 50 wt % of metakaolin (OPTIPOZZ metakaolin, Burgess Pigment Co, Sandersville, Ga.), 26 wt % of sodium silicate solution (Grade 40, Occidental Chemical Corporation, Dallas, Tex.), and 24 wt % of sodium hydroxide solution (50% caustic soda diaphragm, Occidental Chemical Corporation, Dallas, Tex.). The geopolymer mixture is a dry mix with no-slump consistency whose viscosity cannot be measured using a Brookfield RVTDV-II viscometer at room temperature. No geopolymer tube can be produced in this example.

Comparative Example D

A geopolymer mixture is used to produce geopolymer tubes in the same way as that in Comparative Example A except that a different geopolymer composition is used. The geopolymer composition is prepared by mixing OPTIPOZZ metakaolin with a pre-mixed sodium silicate and sodium hydroxide activator solution having a $SiO_2$ to $Na_2O$ weight ratio of 0.6. The geopolymer mixture comprises 45 wt % of metakaolin (OPTIPOZZ metakaolin, Burgess Pigment Co, Sandersville, Ga.), 31 wt % of sodium silicate solution (Grade 40, Occidental Chemical Corporation, Dallas, Tex.), and 24 wt % of sodium hydroxide solution (50% caustic soda diaphragm, Occidental Chemical Corporation, Dallas, Tex.). The geopolymer mixture is a dry mix with no-slump consistency whose viscosity cannot be measured using a Brookfield RVTDV-II viscometer at room temperature. No geopolymer tube can be produced in this example.

Comparative Example E

A geopolymer mixture is used to produce geopolymer tubes in the same way as that in Comparative Example A except that a different geopolymer composition is used. The geopolymer composition is prepared by mixing Celceram 14A Type F fly ash with a sodium silicate activator solution having a $SiO_2$ to $Na_2O$ weight ratio of 2. The geopolymer mixture comprises 80 wt % of Type F fly ash (Celceram 14A fly ash, Boral Material Technologies Inc., San Antonio, Tex.) and 20 wt % of sodium silicate solution (Grade D sodium silicate, PQ Corporation, Valley Forge, Pa.). The geopolymer mixture is a dry mix with no-slump consistency whose viscosity cannot be measured using a Brookfield RVTDV-II viscometer at room temperature. No geopolymer tube can be produced in this example.

Comparative Example F

A geopolymer composition is prepared by mixing PowerPozz metakaolin with a pre-mixed sodium silicate and sodium hydroxide activator solution having a $SiO_2$ to $Na_2O$ weight ratio of 1.3. The geopolymer mixture comprises 10 wt % of metakaolin (PowerPozz metakaolin, Advanced Cement Technologies, Blaine, Wash.), 68 wt % of sodium silicate solution (Grade 40, Occidental Chemical Corporation, Dallas, Tex.), and 23 wt % of sodium hydroxide solution (50% caustic soda diaphragm, Occidental Chemical Corporation, Dallas, Tex.). The geopolymer mixture is mixed using an overhead mixer until a uniform mixture is obtained.

The geopolymer mixture is a slurry with fluid consistency whose viscosity is measured according to ASTM E3070 using a Brookfield RVTDV-II rotational viscometer with a No. 2 RV spindle at 23° C. The apparent viscosity of the geopolymer mixture is 154 and 173 cP at a spindle rotational speed of 50 and 100 rpm, respectively. The shear thinning index of the geopolymer mixture at 50 and 100 rpm ($STI_{50-100}$) is 0.89, which is smaller than 1, indicating that the geopolymer mixture is a shear thickening mixture.

The mixture is transferred into a PEX pipe mold with a 17 mm inner diameter to fill 50% by volume of the mold. After placing end caps on the mold, the mold is horizontally secured on a variable speed lathe and rotated at ambient temperature at a rotational speed of 300 rpm and a tangential velocity of 0.27 m/s at the interface of the mold and geopolymer mixture. No geopolymer tube is produced after 24 h. In another run, the mold is rotated at a rotational speed of 4000 rpm and a tangential velocity of 3.6 m/s. Even after 8 h of centrifugal processing, only a portion of the geopolymer mixture forms a tube on the inner surface of the mold while the rest remains in a slurry form. After pouring out the remaining slurry, the molded geopolymer tube is placed into a sealed container to cure at either ambient temperature or 60° C. for 20 hours. Cracks develop throughout the tube during the curing and no useful geopolymer tube is obtained.

Comparative Example G

A geopolymer mixture is used to produce geopolymer tubes in the same way as that in Comparative Example F except that a different geopolymer composition is used. The geopolymer mixture comprises 20 wt % of metakaolin (PowerPozz metakaolin, Advanced Cement Technologies, Blaine, Wash.), 60 wt % of sodium silicate solution (Grade 40, Occidental Chemical Corporation, Dallas, Tex.), and 20 wt % of sodium hydroxide solution (50% caustic soda diaphragm, Occidental Chemical Corporation, Dallas, Tex.). The geopolymer mixture is mixed using an overhead mixer until a uniform mixture is obtained.

The geopolymer mixture is a slurry with fluid consistency whose viscosity is measured according to ASTM E3070 using a Brookfield RVTDV-II rotational viscometer with a No. 2 RV spindle at 23° C. The apparent viscosity of the geopolymer mixture is 266 and 268 cP at a spindle rotational speed of 50 and 100 rpm, respectively. The shear thinning index of the geopolymer mixture at 50 and 100 rpm ($STI_{50-100}$) is 0.99, indicating that the geopolymer mixture is a near Newtonian mixture.

The mixture is transferred into a PEX pipe mold with a 17 mm inner diameter to fill 50% by volume of the mold. After placing end caps on the mold, the mold is horizontally secured on a variable speed lathe and rotated at ambient temperature at a rotational speed of 300 rpm and a tangential velocity of 0.27 m/s at the interface of the mold and geopolymer mixture. After 8 h at 300 rpm, only a portion of the geopolymer mixture forms a tube on the inner surface of the mold while the rest remains in a slurry form. After 24 hours at 300 rpm, a geopolymer tube is formed in the mold. The molded part is taken off the centrifugal processing and cured using the same process as the molded parts in Comparative Example F. Cracks develop throughout the tube during the curing and no useful geopolymer tube is obtained.

Example 1

A geopolymer composition is prepared by mixing PowerPozz metakaolin with a pre-mixed sodium silicate and sodium hydroxide activator solution having a $SiO_2$ to $Na_2O$ weight ratio of 0.8 to fabricate geopolymer tubes according to the method steps illustrated in FIG. 1. The geopolymer mixture comprises 40 wt % of metakaolin (PowerPozz metakaolin, Advanced Cement Technologies, Blaine, Wash.), 34 wt % of sodium silicate solution (Grade 40, Occidental Chemical Corporation, Dallas, Tex.), and 26 wt % of sodium hydroxide solution (50% caustic soda diaphragm, Occidental Chemical Corporation, Dallas, Tex.). The geopolymer mixture is mixed using an overhead mixer until a uniform mixture is obtained.

The geopolymer mixture is a slurry with fluid consistency whose viscosity is measured according to ASTM E3070 using a Brookfield RVTDV-II rotational viscometer with a No. 6 RV spindle at 23° C. The apparent viscosity of the geopolymer mixture is 5300, 4260, and 3890 cP at a spindle rotational speed of 20, 50, and 100 rpm, respectively. The shear thinning index of the geopolymer mixture at 20 and 100 rpm ($STI_{20-100}$) and at 50 and 100 rpm ($STI_{50-100}$) is 1.36 and 1.10 respectively, indicating that the geopolymer mixture is a shear thinning mixture.

The geopolymer mixture is transferred into a PEX pipe mold with a 17 mm inner diameter to fill 50% by volume of the mold. After placing end caps on the mold, the mold is horizontally secured on a variable speed lathe and rotated at ambient temperature at a rotational speed of 300 rpm, reaching a tangential velocity of 0.27 m/s at the interface of the mold and geopolymer mixture. After 2 hours of centrifugal processing, the geopolymer mixture reaches non-flowable consistency and the geopolymer mixture is evenly distributed on the inner wall of the mold. After taking the mold off the centrifugal processing and removing the end caps, the molded geopolymer part is placed into a sealed container and cured at 60° C. for 20 hours. After curing, the geopolymer part is removed from the mold. The cured geopolymer tube has a uniform diameter of 17 mm and even wall thickness of about 2.4 mm, is free of cracks, and has a smooth surface.

The geopolymer mixture is also transferred into a stainless steel tube mold with a 4.5 mm inner diameter to fill 80% by volume of the mold. After placing end caps on the mold, the mold is horizontally secured on a variable speed lathe and rotated at ambient temperature at a rotational speed of 4000 rpm and a tangential velocity of 0.94 m/s at the interface of the mold and geopolymer mixture. After 2 hours at 4000 rpm, the mold is taken off the centrifugal processing and cured using the same process as the 17 mm diameter tube. The cured geopolymer tube has a uniform diameter of 4.5 mm and even wall thickness of about 1.3 mm, is free of cracks, and has a smooth surface.

The geopolymer mixture is also transferred into a PVC pipe mold with a 10.2 cm inner diameter to fill 20% by volume of the mold. After placing end caps on the mold, the mold is horizontally secured on a roller machine and rotated at a rotational speed of 150 rpm at 30° C. and a tangential velocity of 0.8 m/s at the interface of the mold and geopolymer mixture. After 2 hours at 150 rpm, the molded part is taken off the centrifugal processing and cured using the same process as the 17 mm diameter tube. The cured geopolymer tube has a uniform diameter of 10.2 cm and even wall thickness of about 4.9 mm, is free of cracks, and has a smooth surface.

Figure 2:
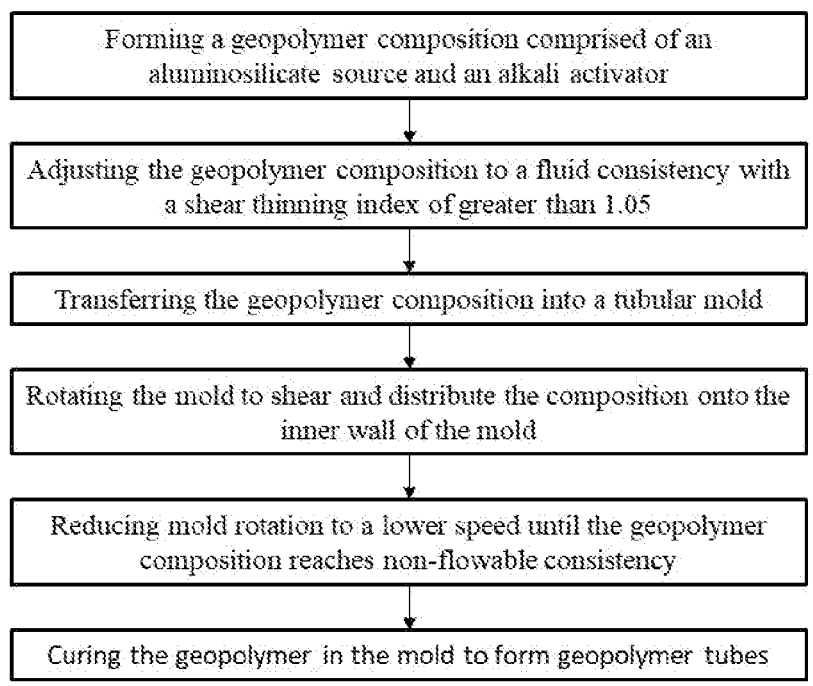
FIG. 2 depicts method steps for forming geopolymer tubes according to a further embodiment of the present invention.

The geopolymer mixture is also prepared to fabricate geopolymer tubes according to the method steps illustrated in FIG. 2 using a pre-heated alkali activator solution to accelerate the geopolymerization process. The pre-mixed alkali activator solution is pre-heated at 50° C. before mixing with the metakaolin. Right after mixing, the geopolymer mixture is transferred into a PEX pipe mold with a 12 mm inner diameter to fill 65% by volume of the mold. After placing end caps on the mold, the mold is horizontally secured on a variable speed lathe and rotated at a rotational speed of 4000 rpm at 35° C. and a tangential velocity of 2.6 m/s at the interface of the mold and geopolymer mixture. After 1 minute at 4000 rpm, the rotational speed is reduced to 300 rpm and a tangential velocity of 0.19 m/s. After 1.5 hours at 300 rpm, the mold is taken off the centrifugal processing and cured using the same process as the 17 mm diameter tube. The cured geopolymer tube has a uniform diameter of 12 mm and even wall thickness of about 2.3 mm, is free of cracks, and has a smooth surface. When the mold is only rotated at 300 rpm without 4000 rpm rotation, geopolymer tubes exhibit rougher surface with visible surface voids, higher variations in wall thickness, and sometimes even a closed end or section.

The compressive strength of the geopolymer mixture after curing is measured according to ASTM standard C773-88 (Standard Test Method for Compressive (Crushing) Strength of Fired Whiteware Materials). The average compressive strength of the geopolymer cured at 60° C. for 20 hours is 29 megapascals (MPa).

Example 2

A geopolymer composition is prepared by mixing PowerPozz metakaolin with a pre-mixed sodium silicate and sodium hydroxide activator solution having a $SiO_2$ to $Na_2O$ weight ratio of 1.2 to fabricate geopolymer tubes according to the method steps illustrated in FIG. 1. The geopolymer mixture comprises 45 wt % of metakaolin (PowerPozz metakaolin, Advanced Cement Technologies, Blaine, Wash.), 39 wt % of sodium silicate solution (Grade 40, Occidental Chemical Corporation, Dallas, Tex.), and 16 wt % of sodium hydroxide solution (50% caustic soda diaphragm, Occidental Chemical Corporation, Dallas, Tex.). The geopolymer mixture is mixed using an overhead mixer until a uniform mixture is obtained.

The geopolymer mixture is a slurry with fluid consistency whose viscosity is measured according to ASTM E3070 using a Brookfield RVTDV-II rotational viscometer with a No. 6 RV spindle at 23° C. The apparent viscosity of the geopolymer mixture is 20600, 16000, 13100, and 11200 cP at a spindle rotational speed of 5, 10, 20, and 50 rpm, respectively. The shear thinning index of the geopolymer mixture at 5 and 50 rpm ($STI_{5-50}$), 10 and 50 rpm ($STI_{10-50}$), and 20 and 50 rpm ($STI_{20-50}$) is 1.84, 1.43, and 1.17 respectively, indicating that the geopolymer mixture is a shear thinning mixture.

The geopolymer mixture is transferred into a PEX pipe mold with a 17 mm inner diameter to fill 40% by volume of the mold. After placing end caps on the mold, the mold is horizontally secured on a variable speed lathe and rotated at ambient temperature at a rotational speed of 4000 rpm and a tangential velocity of 3.6 m/s at the interface of the mold and geopolymer mixture. After 1 minute at 4000 rpm, the rotational speed is reduced to 300 rpm and a tangential velocity of 0.27 m/s. After 1.5 hours at 300 rpm, the molded part is taken off the centrifugal processing and cured using the same process as the molded parts in Example 1. The cured geopolymer tube has a uniform diameter of 17 mm and even wall thickness of about 1.8 mm, is free of cracks, and has a smooth surface. The compressive strength of the geopolymer mixture after curing at 60° C. for 20 hours is 50 MPa, measured in the same way as that in Example 1.

Example 3

A geopolymer composition is prepared by mixing PowerPozz metakaolin with a pre-mixed sodium silicate and sodium hydroxide activator solution having a $SiO_2$ to $Na_2O$ weight ratio of 1.3 to fabricate geopolymer tubes according to the method steps illustrated in FIG. 2. The geopolymer mixture comprises 50 wt % of metakaolin (PowerPozz metakaolin, Advanced Cement Technologies, Blaine, Wash.), 38 wt % of sodium silicate solution (Grade 40, Occidental Chemical Corporation, Dallas, Tex.), and 12 wt % of sodium hydroxide solution (50% caustic soda diaphragm, Occidental Chemical Corporation, Dallas, Tex.). The geopolymer mixture is mixed using an overhead mixer and manually as needed until a uniform mixture is obtained.

The geopolymer mixture is a paste whose viscosity is measured according to ASTM E3070 using a Brookfield RVTDV-II rotational viscometer with a No. 6 RV spindle at 23° C. The apparent viscosity of the geopolymer mixture is 758000, 536000, and 370000 cP at a spindle rotational speed of 0.5, 1, and 2.5 rpm, respectively. The shear thinning index of the geopolymer mixture at 0.5 and 2.5 rpm ($STI_{0.5-2.5}$) and at 1 and 2.5 rpm ($STI_{1-2.5}$) is 2.05 and 1.45 respectively, indicating that the geopolymer mixture is a shear thinning mixture.

The geopolymer mixture is transferred into a PEX pipe mold with a 17 mm inner diameter to fill 45% by volume of the mold. After placing end caps on the mold, the mold is horizontally secured on a variable speed lathe and rotated at ambient temperature at a rotational speed of 4000 rpm and a tangential velocity of 3.6 m/s at the interface of the mold and geopolymer mixture. After 2 minutes at 4000 rpm, the rotational speed is reduced to 300 rpm and a tangential velocity of 0.27 m/s. After 1 hour at 300 rpm, the molded part is taken off the centrifugal processing and cured using the same process as the molded parts in Example 1. The cured geopolymer tube has a uniform diameter of 17 mm and even wall thickness of about 2.1 mm, is free of cracks, and has a smooth surface.

When the geopolymer mixture in this example is used to fabricate geopolymer tubes according to the method steps illustrated in FIG. 1 and the mold is only rotated at 300 rpm without 4000 rpm rotation, geopolymer tubes are just partially formed with a rough surface or exhibit a closed end or section.

Example 4

A geopolymer composition is prepared by mixing PowerPozz metakaolin with a pre-mixed sodium silicate and sodium hydroxide activator solution having a $SiO_2$ to $Na_2O$ weight ratio of 0.8 to fabricate geopolymer tubes according to the method steps illustrated in FIG. 1. The geopolymer mixture comprises 50 wt % of metakaolin (PowerPozz metakaolin, Advanced Cement Technologies, Blaine, Wash.), 29 wt % of sodium silicate solution (Grade 40, Occidental Chemical Corporation, Dallas, Tex.), and 21 wt % of sodium hydroxide solution (50% caustic soda diaphragm, Occidental Chemical Corporation, Dallas, Tex.). The geopolymer mixture is mixed using an overhead mixer and manually as needed until a uniform mixture is obtained. The geopolymer mixture is a shear thinning paste.

The geopolymer mixture is transferred into a PEX pipe mold with a 17 mm inner diameter to fill 55% by volume of the mold. After placing end caps on the mold, the mold is horizontally secured on a variable speed lathe and rotated at ambient temperature at a rotational speed of 4000 rpm and a tangential velocity of 3.6 m/s at the interface of the mold and geopolymer mixture. After 20 minutes at 4000 rpm, the molded part is taken off the centrifugal processing and cured using the same process as the molded parts in Example 1. The cured geopolymer tube has a uniform diameter of 17 mm and even wall thickness of about 2.6 mm, is free of cracks, and has a smooth surface.

Example 5

A geopolymer composition is prepared by mixing Celceram 14A Type F fly ash with a sodium silicate activator solution having a $SiO_2$ to $Na_2O$ weight ratio of 2 to fabricate geopolymer tubes according to the method steps illustrated in FIG. 1. The geopolymer mixture comprises 62 wt % of Type F fly ash (Celceram 14A fly ash, Boral Material Technologies Inc., San Antonio, Tex.) and 38 wt % of sodium silicate solution (Grade D sodium silicate, PQ Corporation, Valley Forge, Pa.). The geopolymer mixture is mixed using an overhead mixer until a uniform mixture is obtained.

The geopolymer mixture is a slurry with fluid consistency whose viscosity is measured according to ASTM E3070 using a Brookfield RVTDV-II rotational viscometer with a No. 6 RV spindle at 23° C. The apparent viscosity of the geopolymer mixture is 7700, 6760, and 6320 cP at a spindle rotational speed of 20, 50, and 100 rpm, respectively. The shear thinning index of the geopolymer mixture at 20 and 100 rpm ($STI_{20-100}$) and at 50 and 100 rpm ($STI_{50-100}$) is 1.22 and 1.07 respectively, indicating that the geopolymer mixture is a shear thinning mixture.

The geopolymer mixture is transferred into a stainless steel tube mold with a 6 mm inner diameter to fill 65% by volume of the mold. After placing end caps on the mold, the mold is horizontally secured on a variable speed lathe and rotated at a rotational speed of 2000 rpm at 30° C., reaching a tangential velocity of 0.64 m/s at the interface of the mold and geopolymer mixture. After 2 hours at 2000 rpm, the molded part is taken off the centrifugal processing and cured using the same process as the molded parts in Example 1. The cured geopolymer tube has a uniform diameter of 6 mm and even wall thickness of about 1.2 mm, is free of cracks, and has a smooth surface.

Example 6

A geopolymer composition is prepared by mixing Celceram 14A Type F fly ash with a sodium silicate activator solution having a $SiO_2$ to $Na_2O$ weight ratio of 2 to fabricate geopolymer tubes according to the method steps illustrated in FIG. 1. The geopolymer mixture comprises 70 wt % of Type F fly ash (Celceram 14A fly ash, Boral Material Technologies Inc., San Antonio, Tex.) and 30 wt % of sodium silicate solution (Grade D sodium silicate, PQ Corporation, Valley Forge, Pa.). The geopolymer mixture is mixed using an overhead mixer until a uniform mixture is obtained.

The geopolymer mixture is a slurry with fluid consistency whose viscosity is measured according to ASTM E3070 using a Brookfield RVTDV-II rotational viscometer with a No. 6 RV spindle at 23° C. The apparent viscosity of the geopolymer mixture is 59600, 45400, 36700, and 31400 cP at a spindle rotational speed of 2.5, 5, 10, and 20 rpm, respectively. The shear thinning index of the geopolymer mixture at 2.5 and 20 rpm ($STI_{2.5-20}$), 5 and 20 rpm ($STI_{5-20}$), and 10 and 20 rpm ($STI_{10-20}$) is 1.90, 1.45, and 1.17 respectively, indicating that the geopolymer mixture is a shear thinning mixture.

The geopolymer mixture is transferred into a PEX pipe mold with a 9 mm inner diameter to fill 55% by volume of the mold. After placing end caps on the mold, the mold is horizontally secured on a variable speed lathe and rotated at ambient temperature at a rotational speed of 1000 rpm, reaching a tangential velocity of 0.48 m/s at the interface of the mold and geopolymer mixture. After 2 hours at 1000 rpm, the molded part is taken off the centrifugal processing and cured using the same process as the molded parts in Example 1. The cured geopolymer tube has a uniform diameter of 9 mm and even wall thickness of about 1.5 mm, is free of cracks, and has high surface smoothness. The compressive strength of the geopolymer mixture after curing at 60° C. for 20 hours is 36 MPa, measured in the same way as that in Example 1.

Example 7

A geopolymer composition is prepared by mixing OPTIPOZZ metakaolin with a pre-mixed sodium silicate and sodium hydroxide activator solution having a $SiO_2$ to $Na_2O$ weight ratio of 1.3 to fabricate geopolymer tubes according to the method steps illustrated in FIG. 2. The geopolymer mixture comprises 35 wt % of metakaolin (OPTIPOZZ metakaolin, Burgess Pigment Co, Sandersville, Ga.), 49 wt % of sodium silicate solution (Grade 40, Occidental Chemical Corporation, Dallas, Tex.), and 16 wt % of sodium hydroxide solution (50% caustic soda diaphragm, Occidental Chemical Corporation, Dallas, Tex.). The geopolymer mixture is mixed using an overhead mixer until a uniform mixture is obtained.

The geopolymer mixture is a slurry with fluid consistency whose viscosity is measured according to ASTM E3070 using a Brookfield RVTDV-II rotational viscometer with a No. 6 RV spindle at 23° C. The apparent viscosity of the geopolymer mixture is 14500, 12800, and 11800 cP at a spindle rotational speed of 10, 20, and 50 rpm, respectively. The shear thinning index of the geopolymer mixture at 10 and 50 rpm ($STI_{10-50}$) and at 20 and 50 rpm ($STI_{20-50}$) is 1.23 and 1.08 respectively, indicating that the geopolymer mixture is a shear thinning mixture.

The geopolymer mixture is transferred into a PEX pipe mold with a 17 mm inner diameter to fill 45% by volume of the mold. After placing end caps on the mold, the mold is horizontally secured on a variable speed lathe and rotated at ambient temperature at a rotational speed of 4000 rpm and a tangential velocity of 3.6 m/s at the interface of the mold and geopolymer mixture. After 2 minutes at 4000 rpm, the rotational speed is reduced to 300 rpm and a tangential velocity of 0.27 m/s. After 2 hours at 300 rpm, the molded part is taken off the centrifugal processing and cured using the same process as the molded parts in Example 1. The cured geopolymer tube has a uniform diameter of 17 mm and even wall thickness of about 2 mm, is free of cracks, and has a smooth surface. The compressive strength of the geopolymer mixture after curing at 60° C. for 20 hours is 18 MPa, measured in the same way as that in Example 1.

When the geopolymer mixture in this example is used to fabricate geopolymer tubes according to the method steps illustrated in FIG. 1 and the mold is only rotated at 300 rpm without 4000 rpm rotation, geopolymer tubes exhibit rougher surface with visible surface voids, higher variations in wall thickness, and sometimes even a closed end or section.

Example 8

A geopolymer composition is prepared by mixing Argical M1000 metakaolin with a pre-mixed sodium silicate and sodium hydroxide activator solution having a $SiO_2$ to $Na_2O$ weight ratio of 0.6 to fabricate geopolymer tubes according to the method steps illustrated in FIG. 1. The activator solution is pre-heated to 45° C. before mixing with the metakaolin. The geopolymer mixture comprises 45 wt % of metakaolin (Argical M1000, Imerys, Roswell, Ga.), 29 wt % of sodium silicate solution (Grade 40, Occidental Chemical Corporation, Dallas, Tex.), and 26 wt % of sodium hydroxide solution (50% caustic soda diaphragm, Occidental Chemical Corporation, Dallas, Tex.). The geopolymer mixture is mixed using an overhead mixer until a uniform mixture is obtained. The geopolymer mixture is a shear thinning slurry with fluid consistency.

The geopolymer mixture is transferred into a PEX pipe mold with a 6 mm inner diameter to fill 55% by volume of the mold. After placing end caps on the mold, the mold is horizontally secured on a variable speed lathe and rotated at a rotational speed of 2000 rpm at 40° C., reaching a tangential velocity of 1.3 m/s at the interface of the mold and geopolymer mixture. After 2 hours at 2000 rpm, the molded part is taken off the centrifugal processing and cured using the same process as the molded parts in Example 1. The cured geopolymer tube has a uniform diameter of 6 mm and even wall thickness of about 1 mm, is free of cracks, and has a smooth surface. The compressive strength of the geopolymer mixture after curing at 60° C. for 20 hours is 30 MPa, measured in the same way as that in Example 1.

While the instant invention has been described above according to its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains.

The invention claimed is:

1. A method of manufacturing geopolymer tubes, comprising: (a) forming a geopolymer composition comprised of an aluminosilicate source and an alkali activator, wherein the geopolymer composition has a fluid consistency and a shear thinning index of greater than 1.05; (b) transferring the geopolymer composition into a tubular mold; (c) rotating the mold to shear and distribute the composition onto the inner wall of the mold until the geopolymer composition reaches non-flowable consistency; and (d) curing the geopolymer in the mold to form geopolymer tubes.

2. The method of claim 1, wherein the geopolymer composition comprises an aluminosilicate source comprising metakaolin, and alkali activator comprising sodium silicate and sodium hydroxide.

3. The method of claim 1, wherein the geopolymer composition comprises an aluminosilicate source comprising fly ash, and alkali activator comprising sodium silicate and sodium hydroxide.

4. The method of claim 1, wherein the geopolymer composition has a fluid consistency with viscosity measurable using a rotational viscometer.

5. The method of claim 1, wherein the geopolymer composition has a viscosity in the range of 5000-100000 cP.

6. The method of claim 1, wherein the geopolymer composition is capable of polymerizing to reach non-flowable consistency in 2 hours.

7. The method of claim 1, wherein the tubular mold has an inner diameter of 1 to 250 mm.

8. The method of claim 1, wherein the tubular mold rotates at a tangential velocity of at least 0.1 meter per second (m/s) at the interface of the mold and geopolymer composition until the geopolymer reaches non-flowable consistency.

9. The method of claim 1, wherein the geopolymer composition is cured in the tubular mold by heating to a temperature between 40 and 100° C. without rotation.

10. The method of claim 1, wherein the geopolymer composition is cured in the tubular mold by heating to a temperature between 40 and 100° C. under continuous rotation.

11. A method of manufacturing geopolymer tubes, comprising: (a) forming a geopolymer composition comprised of an aluminosilicate source and an alkali activator, wherein the geopolymer composition has a fluid consistency and a shear thinning index of greater than 1.05; (b) transferring the geopolymer composition into a tubular mold; (c) rotating the mold to shear and distribute the composition onto the inner wall of the mold; (d) reducing mold rotation to lower speed until the geopolymer composition reaches non-flowable consistency; and (e) curing the geopolymer in the mold to form geopolymer tubes.

12. The method of claim 11, wherein the geopolymer composition comprises an aluminosilicate source comprising metakaolin, and alkali activator comprising sodium silicate and sodium hydroxide.

13. The method of claim 11, wherein the geopolymer composition comprises an aluminosilicate source comprising fly ash, and alkali activator comprising sodium silicate and sodium hydroxide.

14. The method of claim 11, wherein the geopolymer composition has a fluid consistency with viscosity measurable using a rotational viscometer and a shear thinning index of greater than 1.05.

15. The method of claim 11, wherein the geopolymer composition has a viscosity in the range of 5000-100000 cP.

16. The method of claim 11, wherein the geopolymer composition is capable of polymerizing to reach non-flowable consistency in 2 hours.

17. The method of claim 11, wherein the tubular mold has an inner diameter of 1 to 250 mm.

18. The method of claim 11, wherein the tubular mold rotates at a tangential velocity of at least 0.5 m/s at the interface of the mold and geopolymer composition to reduce geopolymer viscosity and distribute the composition to the inner wall of the mold.

19. The method of claim 18, wherein mold rotational speed is reduced to a tangential velocity between about 0.5 to about 0.1 m/s at the interface of the mold and geopolymer composition until the geopolymer reaches non-flowable consistency.

20. The method of claim 11, wherein the geopolymer composition is cured in the tubular mold by heating to a temperature between 40 and 100° C.

* * * * *